(12) United States Patent
Abe et al.

(10) Patent No.: US 12,240,379 B2
(45) Date of Patent: Mar. 4, 2025

(54) ILLUMINATION CONTROL DEVICE AND ILLUMINATION CONTROL METHOD FOR A SHIFTER OF A VEHICLE

(71) Applicant: Honda Motor Co., Ltd., Tokyo (JP)

(72) Inventors: Fumitaka Abe, Tokyo (JP); Yosuke Horiuchi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 108 days.

(21) Appl. No.: 18/170,510

(22) Filed: Feb. 16, 2023

(65) Prior Publication Data
US 2023/0311754 A1 Oct. 5, 2023

(30) Foreign Application Priority Data
Mar. 30, 2022 (CN) .......................... 202210324783.3

(51) Int. Cl.
*B60Q 3/82* (2017.01)
*B60K 23/02* (2006.01)
*B60Q 3/283* (2017.01)

(52) U.S. Cl.
CPC ............... *B60Q 3/82* (2017.02); *B60K 23/02* (2013.01); *B60Q 3/283* (2017.02)

(58) Field of Classification Search
CPC ... B60Q 3/60; B60Q 3/64; B60Q 3/76; B60Q 3/80; B60Q 3/82; B60Q 3/267; B60Q 3/283; B60Q 3/371
See application file for complete search history.

(56) References Cited

U.S. PATENT DOCUMENTS

| | | | | |
|---|---|---|---|---|
| 6,522,029 B1* | 2/2003 | Bell | ........................ | B60R 25/24 307/10.6 |
| 7,987,030 B2* | 7/2011 | Flores | .................... | B60Q 3/283 340/438 |
| 2011/0115375 A1* | 5/2011 | Shiratsuchi | ............ | B60Q 1/247 315/77 |
| 2015/0266418 A1* | 9/2015 | Salter | ..................... | B60Q 3/217 362/543 |
| 2018/0099611 A1* | 4/2018 | Sugimoto | .............. | G07B 13/04 |
| 2019/0217776 A1* | 7/2019 | Sato | ........................ | B60Q 3/80 |
| 2020/0039423 A1* | 2/2020 | Pan | ........................ | H05B 45/20 |

FOREIGN PATENT DOCUMENTS

| | | |
|---|---|---|
| JP | H01294789 | 11/1989 |
| JP | 2018023291 | 2/2018 |

* cited by examiner

*Primary Examiner* — Tung X Le
(74) *Attorney, Agent, or Firm* — JCIPRNET

(57) ABSTRACT

The disclosure provides an illumination control device and an illumination control method for a shifter of a vehicle, and the illumination control device includes a shifter disposed on a steering column and having a light source; a vehicle door open-and-closed detection part detecting an open-and-closed state of a door of the vehicle to generate a vehicle door open-and-closed signal; a control device controlling an illumination of the light source. After a driver driving the vehicle switches on an ignition switch, the control device performs a lighting control to turn on the light source, and when the ignition switch is in an OFF state and after a vehicle door open-and-closed signal indicating the door is switched from an open state to a closed state is detected, the control device performs the lighting control to turn on the light source.

9 Claims, 3 Drawing Sheets

ILLUMINATION CONTROL DEVICE AND ILLUMINATION CONTROL METHOD FOR A SHIFTER OF A VEHICLE

CROSS-REFERENCE TO RELATED APPLICATION

This application claims the priority benefit of Chinese application no. 202210324783.3, filed on Mar. 30, 2022. The entity of the above-mentioned patent application is hereby incorporated by reference herein and made a part of this specification.

BACKGROUND

Technical Field

The disclosure relates to an illumination control device and an illumination control device for a shifter of a vehicle.

Description of Related Art

In recent years, in order to ensure an affordable, reliable, sustainable, and advanced way for more people to store and use energy, research and development related to lighting inside a vehicle and contributing to energy efficiency have been carrying out.

The related art 1 (Japanese Patent Application No. H01-294789) discloses a structure which allows a vehicle driver to drive in no need of moving his/her hands away from a steering wheel during speed transmission through arranging a shifter on a steering column.

Besides, the related art 2 (Japanese Patent Application No. 2018-23291) discloses that a shifter disposed on a steering column has a display unit composed of a liquid crystal display or an organic electroluminenscence (EL) display to improve the visibility of the shifter. TEST The structure disclosed in the related art is a technology to facilitate a driver to operate the shifter disposed on the steering column while driving, but such a structure has been applied to limited types of mass-produced vehicles.

Therefore, for a driver who often drives a vehicle with a shifter (a direct shifter gearbox) disposed on a center console panel of the vehicle, if the driver drives another vehicle with a shifter disposed on the steering column (e.g., as a taxi driver or a substitute driver), the driver is not able to locate the shifter quickly at the first time of driving the another vehicle. Since it takes some time for the driver to start to drive, there is room for improvement.

In the technology related to shifter identification, how to make the driver quickly identify the position of the shifter is an issue.

SUMMARY

An embodiment of the disclosure provides an illumination control device for a shifter of a vehicle, and the illumination control device includes a shifter that is disposed on a steering column and has a light source; a vehicle door open-and-closed detection part that detects an open-and-closed state of a door of the vehicle to generate a vehicle door open-and-closed signal; a control device that controls an illumination of the light source. The control device performs a lighting control to turn on the light source after a driver driving the vehicle switches on an ignition switch, and the control device performs the lighting control to turn on the light source when the ignition switch is in an OFF state and after the vehicle door open-and-closed signal indicating that the door of the vehicle is switched from an open state to a closed state is detected.

According to an embodiment of the disclosure, in the illumination control device for the shifter of the vehicle, the lighting control includes a first lighting control and a second lighting control, the light source further includes a first light source and a second light source, the first light source is turned on by the first lighting control, and the second light source is turned on by the second lighting control.

According to an embodiment of the disclosure, in the illumination control device for the shifter of the vehicle, the second lighting control is to turn off the second light source after the second light source is turned on and after the shifter shifts to a driving gear.

According to an embodiment of the disclosure, in the illumination control device for the shifter of the vehicle, after the second light source is turned off, the control device does not perform the second lighting control until the vehicle door open-and-closed signal indicates the door is switched from the closed state to the open state and then switched to the closed state.

According to an embodiment of the disclosure, in the illumination control device for the shifter of the vehicle, the first lighting control is to continuously turn on the first light source, and the second lighting control is to flash the second light source.

According to an embodiment of the disclosure, in the illumination control device for the shifter of the vehicle, an illumination brightness of the second light source through the second lighting control is greater than an illumination brightness of the first light source through the first lighting control.

According to an embodiment of the disclosure, in the illumination control device for the shifter of the vehicle, an illumination color of the first light source through the first lighting control is different from an illumination color of the second light source through the second lighting control.

According to an embodiment of the disclosure, in the illumination control device for the shifter of the vehicle, the first light source is configured to turn on a plurality of gear lights disposed on the shifter, and the second light source is configured to turn on an identification light for identifying a position of the shifter.

According to an embodiment of the disclosure, in the illumination control device for the shifter of the vehicle, an illumination control method for a shifter of a vehicle, where the shifter is disposed on a steering column and has a light source, and the illumination control method includes: detecting an open-and-closed state of a door of the vehicle to generate a vehicle door open-and-closed signal; controlling an illumination of the light source based on the vehicle door open-and-closed signal and an ignition signal; performing a first lighting control to turn on the light source based on the ignition signal generated by an ignition switch after a driver driving the vehicle switches on the ignition switch; performing a second lighting control to turn on the light source when the ignition switch is in an OFF state and after the vehicle door open-and-closed signal indicating that the door of the vehicle is switched from an open state to a closed state is detected.

To make the above-mentioned features of the disclosure more understandable, embodiments are provided hereinafter with the accompanying drawings and detailed descriptions.

DESCRIPTION OF THE EMBODIMENTS

Figure 1:
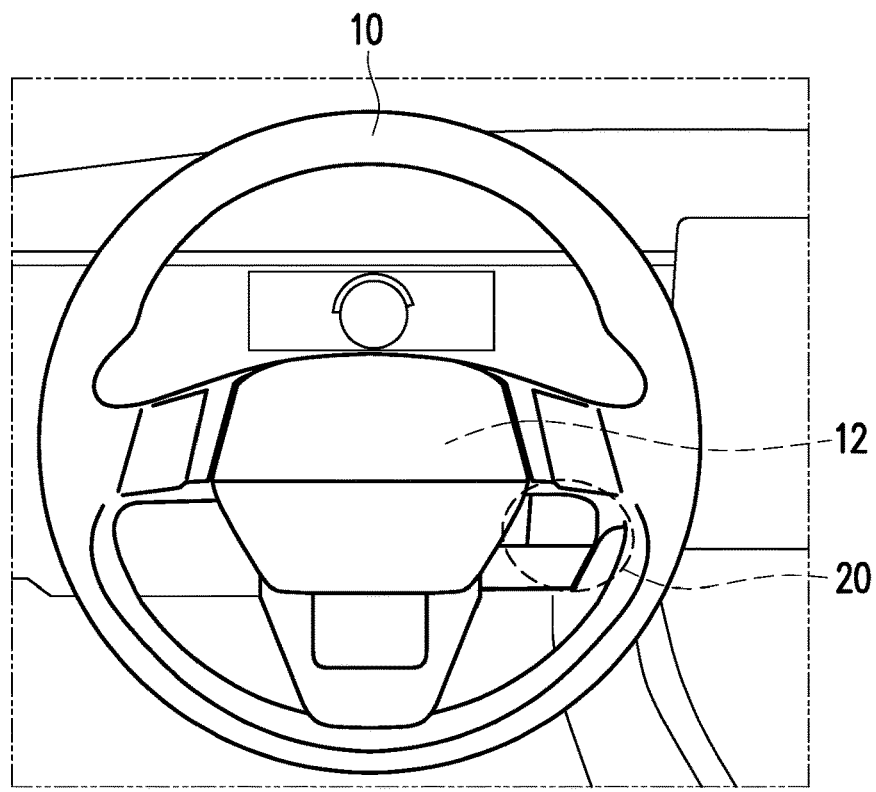
FIG. 1 is a schematic view illustrating a structure of a steering column where a shifter is disposed.

To resolve the issue raised in the related art, this application aims at enabling the driver to quickly identify and find the position of the shifter. In addition, the application also aims at improving energy efficiency.

Through the illumination control method provided in the disclosure, the light source is turned on after the ignition switch is switched on, and a time point at which the driver is seated in the vehicle is estimated according to the timing of opening the door of the vehicle and then closing the door of the vehicle, so as to turn on the light source. Thus, the driver is able to quickly find the shifter when riding the vehicle for the first time, which improves the convenience for the driver.

Reference will now be made in detail to the exemplary embodiments of the disclosure, examples of which are illustrated in the accompanying drawings. Wherever possible, the same reference numerals are used in the drawings and description to refer to the same or like parts.

FIG. 1 is a schematic view illustrating a structure of a steering column where a shifter is disposed. As shown in FIG. 1, a steering wheel 10 of a vehicle is disposed on a steering column 12, so that the driver is able to turn the vehicle by rolling the steering wheel 10 and making front wheels of the vehicle to turn accordingly. The shifter 20 is disposed on the steering column 12 (the steering wheel) for the driver to operate to shift gears in the gearbox of the vehicle to drive the vehicle (a D gear), back the vehicle (an R gear), put the gear in neutral (an N gear), or put the gear in parking when the driver parks the vehicle (a P gear). Here, the four gears are exemplified as DNRP, which should however not be construed as a limitation. The drive gear may include more different gears which are designed according to different vehicle models.

Figure 2:
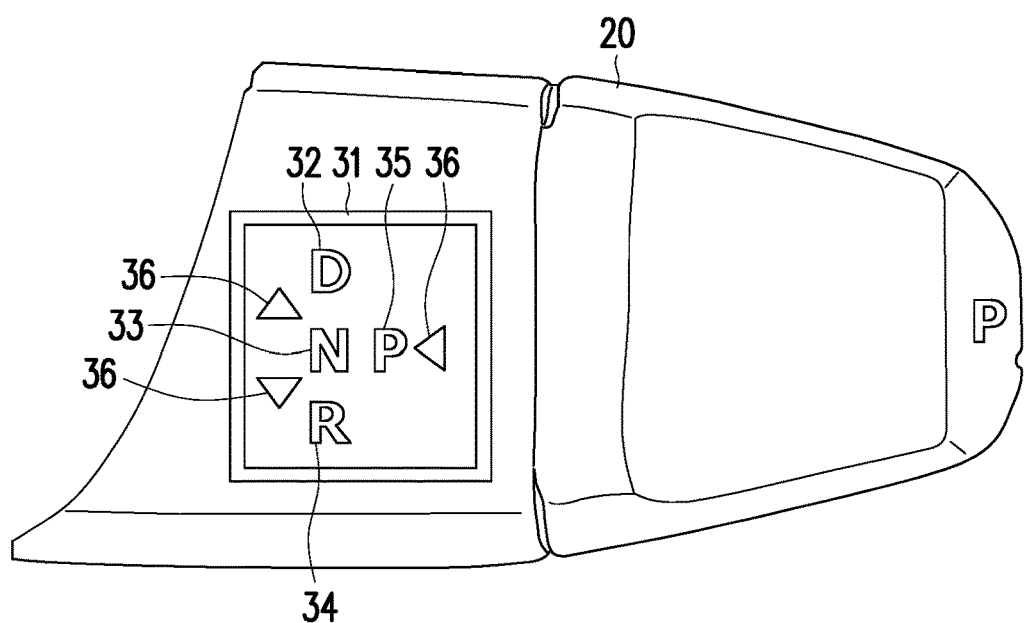
FIG. 2 is a schematic view illustrating a structure of a shifter according to an embodiment of the disclosure.

FIG. 2 is a schematic view illustrating a structure of a shifter according to an embodiment of the disclosure. As shown in FIG. 2, the shifter 20 is a device that allows the driver of the vehicle to put the vehicle in gear or shift gears, so that the vehicle may run. Generally, the gears may include the above-mentioned D gear, N gear, R gear, P gear, and so on. According to an embodiment of the disclosure, the shifter 20 is equipped with gears lights that include a drive gear light 32, a neutral gear light 33, a reverse gear light 34, and a parking gear light 35. The shifter 20 may also be equipped with a light 36 for indicating a direction of each gear.

According to an embodiment of the disclosure, the drive gear light 32, the neutral gear light 33, the reverse gear light 34, and the parking gear light 35 may be illuminated by a first light source disposed on the shifter 20. The first light source may further instruct the light 36 indicating the direction of each gear to perform lighting. That is, the first light source serves to illuminate a shifter position.

The shifter 20 is further equipped with an identification light 31. According to an embodiment of the disclosure, the identification light 31 may, for instance, display a frame to surround all the gears (DNRP). Through the identification light 31 which displays a lighting frame, the driver is able to quickly find the position of the shifter 20. According to an embodiment of the disclosure, the identification light 36 may be illuminated by the second light source disposed on the shifter 20.

Here, the first light source and the second light source may be turned on through applying different control methods, or the illumination colors of the first light source and the second light source may be different.

Figure 3:
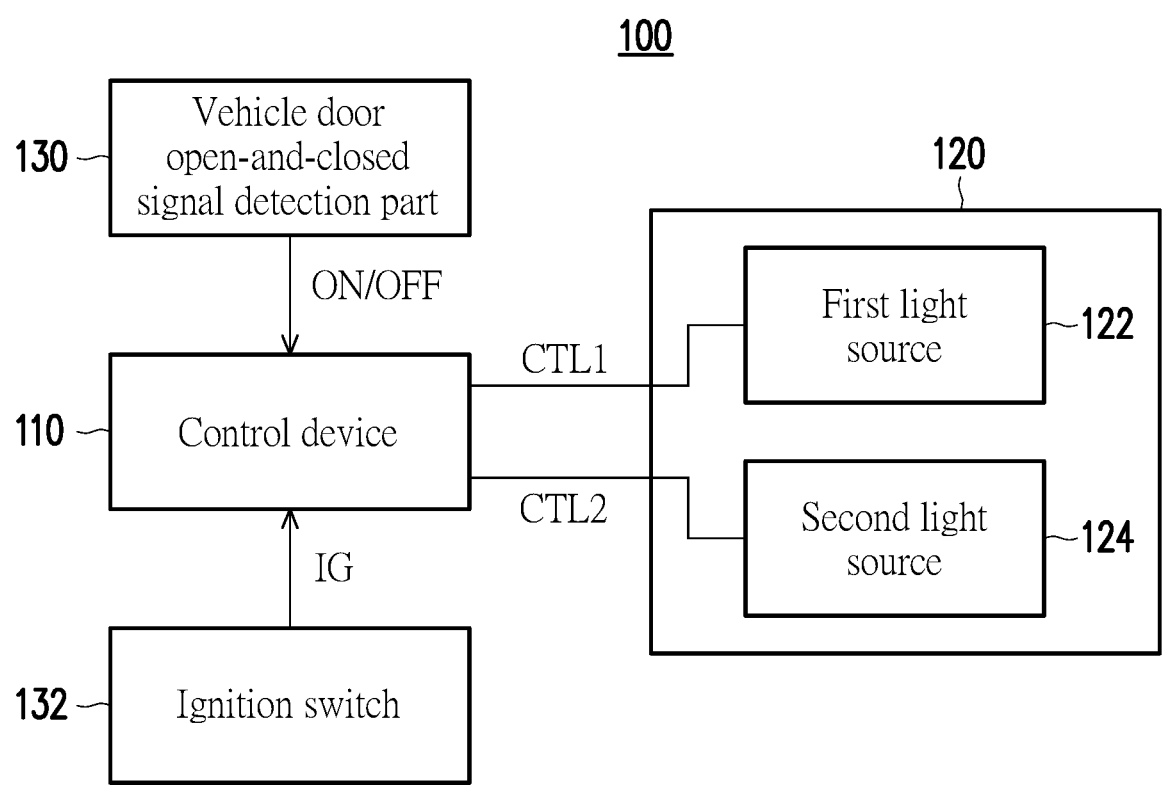
FIG. 3 is a schematic block view illustrating an illumination control device for a shifter of a vehicle according to an embodiment of the disclosure.

FIG. 3 is a schematic block view illustrating an illumination control device for a shifter of a vehicle according to an embodiment of the disclosure. As shown in FIG. 3, an illumination control device 100 for the shifter of the vehicle at least includes a control device 110, a light source 120, a vehicle door open-and-closed signal detection part 130, and an ignition switch 132, and the light source 120 may further include a first light source 122 and a second light source 124.

The control device 10 is, for instance, constituted by a processor or an engine control unit (ECU) of a vehicle. The control device 10 may control each to-be-controlled component of the entire vehicle. Here, the illumination control of the shifter will be elaborated. The control device 10 is coupled to the light source 120, the vehicle door open-and-closed signal detection part 130, and the ignition switch 132, and the control device 10 performs a lighting control to turn on the light source 120 based on an output from the vehicle door open-and-closed signal detection part 130 and the ignition switch 132.

The vehicle door open-and-closed detection part 130 detects an open-and-closed state of a door of the vehicle to generate a vehicle door open-and-closed signal which is indicative of the open-and-closed state of the vehicle of the door. The open-and-closed state of the door of the vehicle may be detected by applying various available sensors, which should however not be construed as a limitation in the disclosure. According to the open-and-closed state of the door of the vehicle, the vehicle door open-and-closed signal is output. If the door of the vehicle is in the open state, the vehicle door open-and-closed signal indicating "ON" is output; if the door of the vehicle is in the closed state, the vehicle door open-and-closed signal indicating "OFF" is output. Through a series of the "ON" and "OFF" vehicle door open-and-closed signals, the open-and-closed state of the door of the vehicle may be detected. The vehicle door open-and-closed signal output by the vehicle door open-and-closed signal detection part 130 is sent to the control device 110.

The ignition switch 132 is disposed in the vehicle, e.g., on the center console panel of the vehicle, and the driver may switch on the ignition switch 132 to start the engine of the vehicle. The ignition switch 132 may send an ignition signal IG to the control device 110, so that the control device 110 is able to determine whether the vehicle is started. Besides, through switching on the ignition switch 132, the shifter 20 may also enter the ON state; namely, the shifter 20 may be operated by the driver to put the vehicle in gear or shift gears.

The light source 120 includes the first light source 122 and the second light source 124. As mentioned above, the first light source 122 may serve to illuminate the drive gear light (D) 32, the neutral gear light (N) 33, the reverse gear light (R) 34, and the parking gear light (P) 35 on the shifter 20, so that the driver may easily identify the position of each gear. The second light source 124 may serve to illuminate the identification light 31. As such, the driver is able to quickly find the position of the shifter 20. Here, the first light source 122 and the second light source 124 may have different colors.

The control device 110 receives the ON/OFF signal output from the vehicle door open-and-closed signal detection part 130 and ignition switch 132, and the control device 110 accordingly outputs a control signal CTL1 of a first lighting control to the first light source 122 for the lighting control and outputs a control signal CTL2 of a second lighting control to the second light source 124 for the lighting control.

When the ignition switch 132 is in an OFF state (i.e., the output signal is OFF), and the vehicle door open-and-closed signal indicating the door of the vehicle is switched from an open state to a closed state is detected, the control device 100 performs a second lighting control to turn on the second light source. Thus, the light 31 of a frame-like shape is illuminated, so that the driver is able to quickly find the shifter 20. Besides, after the driver driving the vehicle switches on the ignition switch 132 (i.e., the output signal is ON), the control device 110 performs the first lighting control to turn on the light source 120, whereby the first light source 122 is illuminated, i.e., the gear lights displaying the D gear, the N gear, the R gear, and the P gear are turned on. The lighting control is further elaborated hereinafter with reference to a timing diagram.

Figure 4:
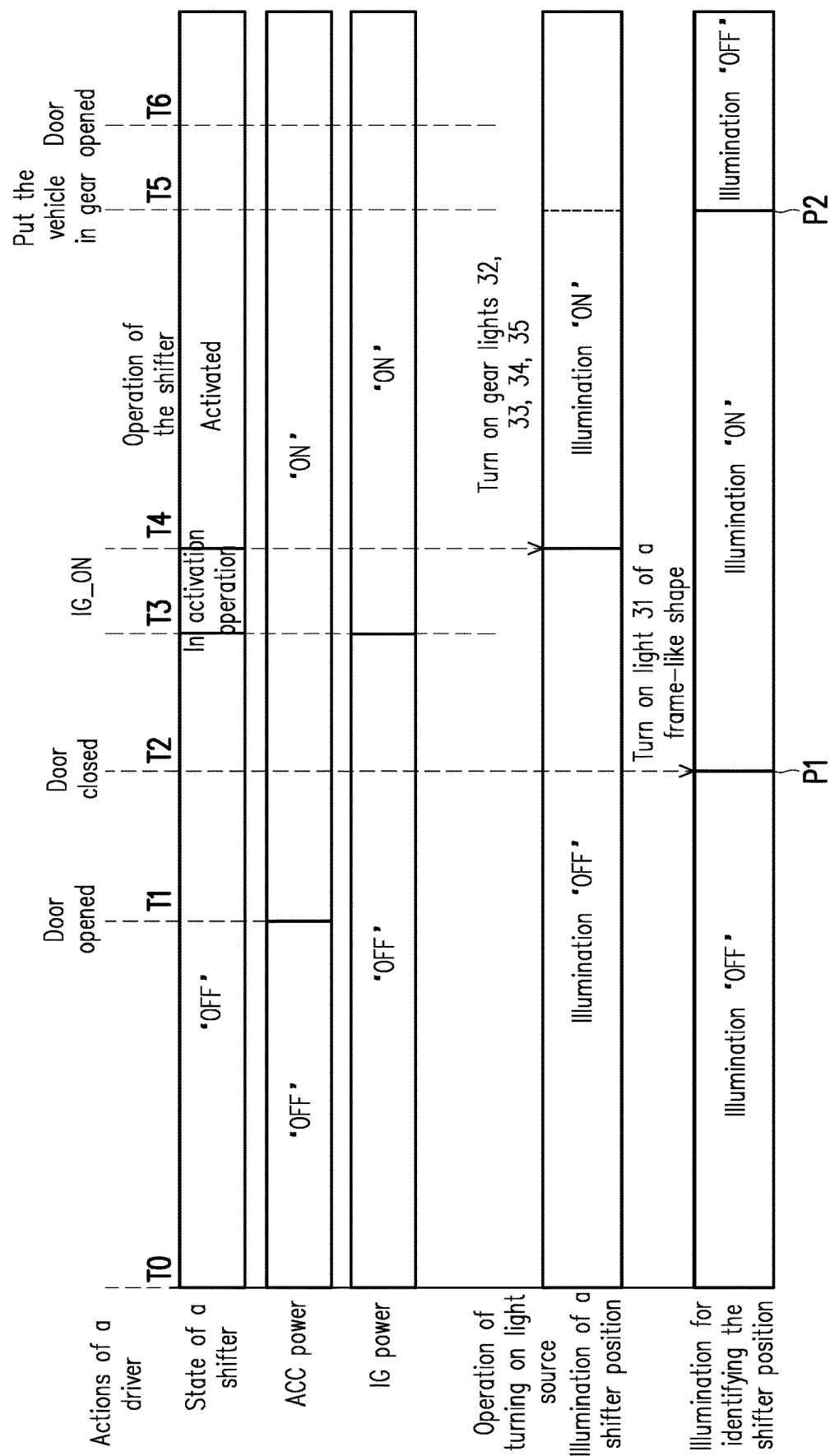
FIG. 4 is a schematic timing control diagram of an illumination control device for a shifter of a vehicle according to an embodiment of the disclosure.

FIG. 4 is a schematic timing control diagram of an illumination control device for a shifter of a vehicle according to an embodiment of the disclosure. As shown in FIG. 4, the timing diagram includes actions of the driver and actions of the lighting.

In FIG. 4, at a time point T0, the shifter is in an OFF state; that is, the driver does not operate the shifter 20. At a time point T1, the driver opens the door of the vehicle, and after the driver is seated, the driver closes the door of the vehicle at a time point T2. Afterwards, at a time point T3, the driver switches on the ignition switch 132; at this time, the engine is started, the shifter 20 undergoes an activation operation, and the state of the shifter 20 is switched to an ON state. Hence, at a time point T4, after a period of the activation operation, the shifter 20 is activated, and the driver is able to operate the shifter 20 and put the vehicle in gear at an appropriate time point T5, e.g., shift the gear to the D gear. After that, at an appropriate time point T6, the driver starts to drive the vehicle.

Regarding an accessory (ACC) power signal, at the time point T0, the ACC power signal is also in an OFF state, and the ACC power is an accessory power. At the time point T1, when the driver opens the door of the vehicle, the ACC power signal turns to ON state, and the ACC power becomes activated (ON). At this time, the driver is able to operate some electrical accessories other than the engine on the vehicle, such as electric doors and windows, audio system, indoor light, and so on.

Regarding an ignition (IG) power, at the initial time point T0, the driver has not yet switched on the ignition switch 132, and the ignition power has not been activated at this time and thus appears to be in the OFF state. As mentioned above, at the time point T3, when the driver switches on the ignition switch 132, the ignition power is activated and is switched to the ON state.

Besides, in terms of the lighting operation of the shifter 20, the first lighting control, i.e., an illumination of the shifter position, is explained first. At the initial time point T0 when the driver has not yet opened the door of the vehicle nor entered the vehicle, the control signal CTL1 of the first lighting control is in the OFF state; namely, the control device 110 does not perform the first lighting control to turn on the first light source 122. Even if the driver opens the door of the vehicle and enters the vehicle at the time point T1 and closes the door of the vehicle at the time point T2, the control device 110 does not perform the first lighting control at this time.

When the driver switches on the ignition switch 132, and at the time point T4 when the shifter 20 completes the activation operation, the control device 110 starts to output the control signal CTL1 (ON) of the first lighting control to the first light source 122 of the light source 120, whereby the light of each gear (PDNR, etc.) starts to be turned on. In addition, during a period of driving the vehicle, the first lighting control may be continued; that is, the light of each gear (PDNR, etc.) is continuously turned on for illumination during the period of driving the vehicle.

The second lighting control is directed to the illumination the shifter for identification (the lighting control of the identification light 31). At the initial time point T0 when the driver has not yet opened the door of the vehicle nor entered the vehicle, the control signal CTL2 of the second lighting control is also in the OFF state; namely, the control device 110 does not perform the second lighting control to turn on the second light source 124. Next, the driver opens the door of the vehicle and enters the vehicle at the time point T1 and closes the door of the vehicle at the time point T2. At this time, when the control device 110 receives the vehicle door open-and-closed signal as being OFF, the control device 110 outputs the control signal CTL2 (ON) of the second lighting control, which starts the lighting control to turn on the second light source 124. That is, the identification light 31 on the shifter 20 starts to be turned on.

Once the control device 110 detects that the door of the vehicle has been closed, it means that the driver is about to switch on the ignition switch 132 to start the engine, and at the same time, the shifter 20 also starts the activation operation. At the time point T2, by turning on the identification light 31 of the shifter 20, the driver is able to quickly find the position of the shifter 20 on the steering column. Therefore, the driver does not need any additional time for finding the shifter.

Next, at the time point T5, when the driver puts the vehicle in gear and prepares to drive the vehicle, since the position of the shifter 20 is determined, at the time point T5, the control device 110 may turn the control signal CTL2 of the second lighting control to the OFF state, so as to end the second lighting control. At this time, the identification light 31 of the shifter 20 is turned off.

According to an embodiment of the disclosure, the first lighting control is performed to turn on the light source after the activation operation of the shifter 20 is completed; the second lighting control is performed to turn on the light source when the control device 110 detects that the door of the vehicle is turned, and the operation of turning on the light source is stopped after the driver puts the vehicle in gear (from the time point P1 to the time point P2).

Through the above-mentioned control method, the light source 120 is turned on after the ignition switch 132 is switched on (ON), and the time point at which the driver is seated in the vehicle is estimated according to the timing of opening the door of the vehicle and then closing the door of the vehicle, so as to turn on the light source 120. Thus, the driver is able to quickly find the shifter 20 when riding the vehicle for the first time, which improves the convenience for the driver.

Besides, through the first lighting control to turn on the first light source (the illumination of the shifter position, i.e., DNRP, etc.) and the second lighting control to turn on the second light source (the illumination of the surrounding frame of the shifter position) according to this embodiment of the disclosure, the driver is able to time, distinguish the illumination part of the light source when the driver drives and rides the vehicle, and therefore the driver is able to locate the shifter 20 easily, which improves the convenience for the driver.

Additionally, the second lighting control is to turn off the second light source after the second light source is illuminated and after the shifter shifts to a driving gear (e.g., the D gear or the R gear). Thus, the power consumption of turning on the light source may be reduced, so as to achieve a power saving effect.

Moreover, according to one or more embodiments of the disclosure, the control device 110 may not perform the second lighting control until the vehicle door open-and-closed signal indicates the door of the vehicle is switched from the closed state to the open state and then switched to the closed state. After the second light source is turned off, in the event that the driver does not get off the vehicle (i.e., when it is unable to detect whether the driver opening and closing the door of the vehicle gets off the vehicle, it may be determined that the driver is not switched to another driver), it is not necessary to turn on the second light source 124 to improve the ease of finding of shifter 20 at this time, and thus the second light source lighting is not required to be turned on. As such, the power consumption of turning on the light source may be reduced, so as to achieve the power saving effect.

Regarding lighting control, the disclosure embodiment can also perform the following control. For instance, the control device 110 performs the first lighting control to turn on the first light source 122 with a constant brightness. In addition, the second lighting control may be performed to turn on the second light source 124 in a flashing manner. Since the second light source 124 is turned on in a flashing manner, it is easier for the driver to notice that the second light source 124 is flashing, so that the driver is able to see the identification light 31 more easily and quickly and thereby find the shifter 20, which also improves convenience for the driver.

According to one or more embodiments of the disclosure, other lighting controls may be performed as explained hereinafter. For instance, the control device 110 may control an illumination brightness of the second light source 124 through the second lighting control to be greater than an illumination brightness of the first light source 122 through the first lighting control. Since the brightness of the second light source 124 (the identification light 31) is greater than the brightness of the first light source 122 (the gear lights 32-35, etc.), the driver is able to locate the identification light 31 more easily and quickly due to the difference in the brightness and further find the shifter 20, which is also conducive to improvement of the convenience.

Besides, in an embodiment of the disclosure, an illumination color of the first light source 122 through the first lighting control may be different from an illumination color of the second light source 124 through the second lighting control. For instance, the first light source 122 may be a white light source, and the second light source 124 may be a red light source. Thus, the driver may notice the identification light 31 more easily due to the color difference and thereby find the shifter 20, which also improves the convenience.

According to one or more embodiments of the disclosure as described above, after the driver is seated in the vehicle (e.g., at the time point of closing the door of the vehicle), the identification light for identifying the shifter position may be turned on, so that the driver is able to easily and quickly find the position of the shifter, thus improving the convenience of vehicle operation.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An illumination control device of a vehicle shifter disposed on a steering column of a vehicle, the illumination control device comprising:
    a light source, provided in the vehicle shifter;
    a vehicle door open-and-closed detection part, detecting an open-and-closed state of a door of the vehicle to generate a vehicle door open-and-closed signal;
    a control device, controlling an illumination of the light source,
    wherein the control device performs a lighting control to turn on the light source after a driver driving the vehicle switches on an ignition switch, and
    the control device performs the lighting control to turn on the light source when the ignition switch is in an OFF state and after the vehicle door open-and-closed signal indicating that the door of the vehicle is switched from an open state to a closed state is detected.

2. The illumination control device of the vehicle shifter according to claim 1, wherein the lighting control comprises a first lighting control and a second lighting control,
    the light source further includes a first light source and a second light source,
    the first light source is turned on by the first lighting control, and the second light source is turned on by the second lighting control.

3. The illumination control device of the vehicle shifter according to claim 2, wherein the second lighting control is to turn off the second light source after the second light source is turned on and after the vehicle shifter shifts to a driving gear.

4. The illumination control device of the vehicle shifter according to claim 3, wherein
    after the second light source is turned off, the control device does not perform the second lighting control until the vehicle door open-and-closed signal indicates the door is switched from the closed state to the open state and then switched to the closed state.

5. The illumination control device of the vehicle shifter according to claim 1, wherein the first lighting control is to continuously turn on the first light source, and the second lighting control is to flash the second light source.

6. The illumination control device of the vehicle shifter according to claim 1, wherein an illumination brightness of the second light source through the second lighting control is greater than an illumination brightness of the first light source through the first lighting control.

7. The illumination control device of the vehicle shifter according to claim 1, wherein an illumination color of the first light source through the first lighting control is different from an illumination color of the second light source through the second lighting control.

8. The illumination control device of the vehicle shifter according to claim 1, wherein, the first light source is configured to turn on a plurality of gear lights disposed on the shifter, and the second light source is configured to turn on an identification light for identifying a position of the vehicle shifter.

9. An illumination control method of a vehicle shifter, wherein the vehicle shifter is disposed on a steering column of a vehicle and has a light source, and the illumination control method comprises:

detecting an open-and-closed state of a door of the vehicle to generate a vehicle door open-and-closed signal;

controlling an illumination of the light source based on the vehicle door open-and-closed signal and an ignition signal;

performing a first lighting control to turn on the light source based on the ignition signal generated by an ignition switch after a driver driving the vehicle switches on the ignition switch; and performing a second lighting control to turn on the light source when the ignition switch is in an OFF state and after the vehicle door open-and-closed signal indicating that the door of the vehicle is switched from an open state to a closed state is detected.

* * * * *